United States Patent
Yao et al.

(10) Patent No.: US 8,351,394 B2
(45) Date of Patent: Jan. 8, 2013

(54) ADAPTIVE COMMUNICATION SYSTEM, COMMUNICATION TERMINAL, COMMUNICATION METHOD AND ACCESS POINT

(75) Inventors: Zhonghui Yao, Shenzhen (CN); Yonggang Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 654 days.

(21) Appl. No.: 12/476,674

(22) Filed: Jun. 2, 2009

(65) Prior Publication Data

US 2009/0238164 A1 Sep. 24, 2009

Related U.S. Application Data

(63) Continuation of application No. PCT/CN2008/070213, filed on Jan. 30, 2008.

(30) Foreign Application Priority Data

| Feb. 2, 2007 | (CN) | 2007 1 0003280 |
| Feb. 12, 2007 | (CN) | 2007 1 0084512 |

(51) Int. Cl.
*H04W 4/00* (2009.01)
(52) U.S. Cl. .............................. 370/331; 455/436
(58) Field of Classification Search .................... None
See application file for complete search history.

(56) References Cited

U.S. PATENT DOCUMENTS

| 6,567,667 | B1 | 5/2003 | Gupta et al. |
| 6,965,914 | B2 * | 11/2005 | Dowling ................ 709/203 |
| 7,039,027 | B2 * | 5/2006 | Bridgelall ............... 370/329 |
| 7,096,022 | B2 * | 8/2006 | Gao et al. ............... 455/444 |
| 7,382,741 | B2 * | 6/2008 | Rao ....................... 370/255 |
| 7,657,262 | B2 * | 2/2010 | Grayson .................. 455/444 |
| 7,827,593 | B2 * | 11/2010 | Smith et al. ............. 726/3 |
| 7,853,247 | B2 * | 12/2010 | Dillinger et al. ......... 455/418 |
| 7,870,601 | B2 * | 1/2011 | Pandey et al. ........... 726/2 |

(Continued)

FOREIGN PATENT DOCUMENTS

CN 1606310 A 4/2005

(Continued)

OTHER PUBLICATIONS

International Search Report from P.R. China in International Application No. PCT/CN2008/070213 mailed May 15, 2008.

(Continued)

*Primary Examiner* — Andrew Chriss
*Assistant Examiner* — Roberta A Shand
(74) *Attorney, Agent, or Firm* — Conley Rose, P.C.; Grant Rodolph

(57) ABSTRACT

The embodiments of the present disclosure disclose an adaptive communication system, communication method, communication terminal and Access Point (AP). The system includes: an application mode information obtaining module, configured to obtain information about the application mode supported by the network; and an AP, configured to: provide a communication terminal with application mode information obtained by the application mode information obtaining module, wherein the application mode information indicates the application mode supported by the network; and create a communication connection with the communication terminal based on the application mode negotiated and determined according to the information about the application mode supported by the communication terminal and the information about the application mode supported by the network. The embodiments of the present disclosure may make the most of the access resources, improve the success ratio of access, and reduce unnecessary delay and power consumption.

9 Claims, 12 Drawing Sheets

U.S. PATENT DOCUMENTS

| | | | |
|---|---|---|---|
| 7,924,785 B2 * | 4/2011 | Shaheen et al. | 370/331 |
| 2003/0152044 A1 * | 8/2003 | Turner | 370/328 |
| 2003/0211848 A1 | 11/2003 | Rajkotia et al. | |
| 2004/0203658 A1 * | 10/2004 | Narayanan | 455/414.1 |
| 2005/0007967 A1 * | 1/2005 | Keskar et al. | 370/310 |
| 2005/0026616 A1 * | 2/2005 | Cavalli et al. | 455/436 |
| 2006/0068841 A1 | 3/2006 | Park et al. | |
| 2006/0094427 A1 | 5/2006 | Buckley et al. | |
| 2006/0215576 A1 * | 9/2006 | Yu et al. | 370/252 |
| 2006/0227746 A1 | 10/2006 | Kim et al. | |
| 2007/0074023 A1 * | 3/2007 | Lucidarme | 713/169 |

FOREIGN PATENT DOCUMENTS

| | | |
|---|---|---|
| CN | 1741658 A | 3/2006 |
| CN | 101035375 A | 9/2007 |

OTHER PUBLICATIONS

Written Opinion of the International Searching Authority (translation) dated (mailed) May 15, 2008, issued in related application No. PCT/CN2008/070213, filed Jan. 30, 2008, Huawei Technologies Co., Ltd.

EP Communication—Supplementary European Search Report dated Aug. 19, 2010, issued in related European application No. 08706590.0, Huawei Technologies Co. Ltd.

First Chinese Office Action issued (mailed) Nov. 28, 2008 in related Application No. 200710084512.0, Huawei Technologies Co. Ltd.

Rejection Decision issued (mailed) May 22, 2009 in related Application No. 200710084512.0, Huawei Technologies Co. Ltd.

3rd Generation Partnership Project; Technical Specification Group GSM/EDGE Radio Access Network; Generic Access Network (GAN); Stage 2 (Release 9); 3GPP TS 43.318 V9.0.0 Technical Specification, Dec. 2009, 127 pages.

3rd Generation Partnership Project; Technical Specification Group Services and System Aspects; Feasibility study on 3GPP system to Wireless Local Area Network (WLAN) interworking (Release 9); 3GPP TR 22.934 Technical Specification, Dec. 2009, 30 pgs.

IEEE Standard for Local and metropolitan area networks—Part 21: Media Independent Handover Services, IEEE Std 802.21-2008, IEEE Comp. Soc., Jan. 2009, 323 pgs.

Alcatel et al., Unlicensed Mobile Access (UMA); Architecture (Stage 2); UMA Architecture (Stage 2) R1.0.4 Technical Specification, May 2005, 87 pgs.

* cited by examiner

ADAPTIVE COMMUNICATION SYSTEM, COMMUNICATION TERMINAL, COMMUNICATION METHOD AND ACCESS POINT

CROSS-REFERENCE TO RELATED APPLICATIONS

This application is a continuation of International Patent Application No. PCT/CN2008/070213, filed on Jan. 30, 2008, entitled "Adaptive Communication System, Communication Terminal, Communication Method and Access Point", which claims the benefit of priority of Chinese Patent Application No. 200710003280.1, filed Feb. 2, 2007, and entitled "Adaptive Communication System, Communication Terminal, Communication Method and Access Point", and Chinese Patent Application No. 200710084512.0, filed Feb. 12, 2007, and entitled "Adaptive Communication System, Communication Terminal, Communication Method and Access Point", all of which are incorporated herein by reference in their entireties.

FIELD OF THE DISCLOSURE

The present disclosure relates to a communication system, communication terminal, communication method, and access point, and in particular, to a communication system, communication terminal, communication method and access point which are adaptive to the application mode.

BACKGROUND

Miscellaneous access technologies and standards exist currently, for example, $3^{rd}$ Generation Partnership Project (3GPP)/3GPP2-based 2G and 3G, Institute of Electrical and Electronic Engineering (IEEE) 802-based Wireless Local Area Network (WLAN), Wireless Metropolitan Area Network (WMAN), and Wireless Personal Area Network (WPAN). Integration of networks is a megatrend. However, no uniform standard is available for integration and interworking between access technologies. For example, with respect to interworking with the WLAN, the 3GPP works out an interworking WLAN (I-WLAN) solution which provides loose coupling between the WLAN and the 3GPP, and a Unlicensed Mobile Access (UMA) solution which provides close coupling, both solutions requiring support of different WLAN terminals based on the corresponding standard.

(1) I-WLAN: an interworking WLAN, which accesses the IP Multimedia Subsystem (IMS) or the Internet through WLAN technologies, and then accepts various services. The I-WLAN is a solution developed by the 3GPP for interworking with the WLAN with respect to loose coupling between the WLAN and 3GPP. The 3GPP defines six scenarios of the I-WLAN.

(2) UMA: a solution for close coupling between the WLAN and 3GPP. This solution is put forward by a group led by British Telecom, including operators and terminal manufacturers, and designed to address integration among the WLAN, the Bluetooth, and the cellular networks (such as Global System for Mobile Communications/General Packet Radio Services (GSM/GPRS) core network) so that the terminal devices accept various services from the traditional cellular network through unauthorized wireless access technologies such as WLAN and Bluetooth.

Evidently, for the same access technology, such as WLAN, the upper-layer application mode may differ. Application mode refers to the mode of coupling between the access layer technology and the non-access layer technology. One access-layer technology may be coupled with different non-access layer technologies to implement relevant services. For example, the aforementioned WLAN access technology currently has two application modes, namely, I-WLAN and UMA. Therefore, in a specific communication process, the terminal needs to communicate with the network based on the same application mode. In the prior art, a specific application mode is supported by a specific terminal. However, the terminal is unable to discover or select the target network based on the application mode, thus reducing the success ratio of access and causing unnecessary delay and power consumption. Moreover, one terminal supports only one application mode, and is unable to use the network of other application mode, which makes it impossible to make the most of the access resources and leads to waste of investment.

SUMMARY

The embodiments of the present disclosure provide a communication system, communication terminal, communication method, and access point which are adaptive to the application mode so that the application mode may be matched flexibly between the network and the communication terminal.

An embodiment of the present disclosure provides a communication system adaptive to the application mode. The communication system includes: an application mode information obtaining module configured to obtain the information about the application mode supported by the network; and an access point configured to: provide the communication terminal with the application mode information obtained by the application mode information obtaining module, where the application mode information indicates the application mode supported by the network, and create communication connection with the communication terminal based on the application mode negotiated and determined according to the information about the application mode supported by the communication terminal and the information about the application mode supported by the network.

An embodiment of the present disclosure provides a communication method adaptive to the application mode, including: obtaining the information about the application mode supported by the network, and providing the information for the communication terminal; and creating communication connection between the communication terminal and the network based on the application mode negotiated and determined by the communication terminal after the communication terminal negotiates and determines the application mode according to the information about the application mode supported by the communication terminal and the information about the application mode supported by the network.

An embodiment of the present disclosure provides a communication terminal adaptive to the application mode, including: a first communication interface configured to receive the information from the network, where the information from the network includes the information about the application mode supported by the network; an application mode processing module configured to negotiate and determine the application mode according to the information about the application mode supported by the communication terminal and the received information about the application mode supported by the network; and an application mode adapting module configured to create a communication connection with the network based on the application mode determined through negotiation.

An embodiment of the present disclosure provides an access point, including: an application mode information obtaining module configured to obtain the information about the application mode supported by the network; and a communication interface module configured to send the information about the application mode supported by the network to the interface of the communication terminal, and provide an interface of creating communication between the communication terminal and the network after the communication terminal negotiates and determines the application mode according to the information about the application mode supported by the network and the information about the application mode supported by the communication terminal.

It can be seen from the above technical solution that: through an application mode matching mechanism which makes the network adaptive to the communication terminal, the embodiments of the present disclosure avoid defects, including, for example, a specific application mode requires a specific matching communication terminal. Thus, the present embodiments may, for example, implement flexible matching of application mode between the network and the communication terminal, implement the application-mode adaptive mechanism, discover and select the target network based on the application-mode adaptive mechanism, make the most of the access resources, improve the success ratio of access, and reduce unnecessary delay and power consumption.

The embodiments of the present disclosure are hereinafter described in detail with reference to accompanying drawings and preferred embodiments.

DETAILED DESCRIPTION

Figure 1:
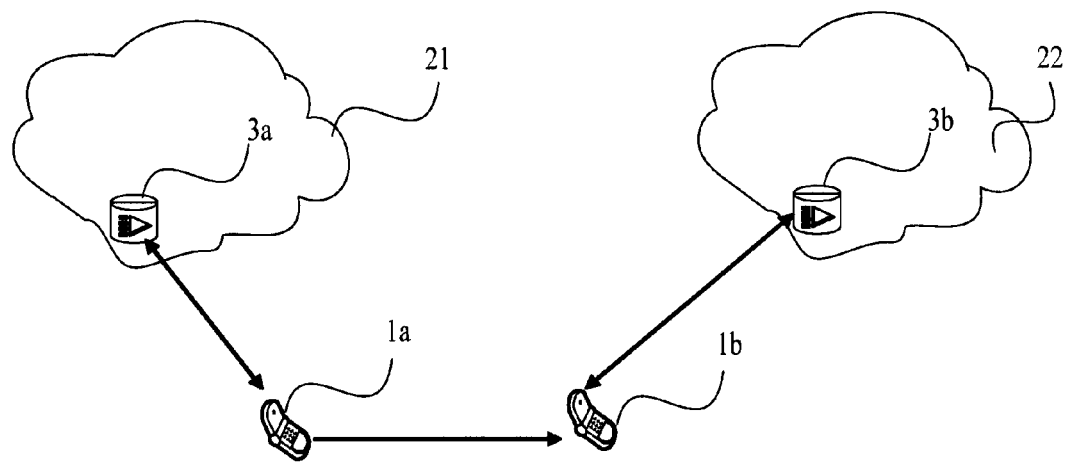
FIG. 1 shows a network structure of an application scenario according to an embodiment of the present disclosure.

FIG. 1 shows a network structure of the application scenario according to an embodiment of the present disclosure. The network structure includes at least: an application mode-adaptive communication terminal 1, including mode-adaptive communication terminals 1a and 1b, and an access network 21, 22. The access network 21, 22 includes at least one access point (AP) 3, for example, AP 3a and AP 3b, which supports terminal adaptability to the application mode. The AP 3 is configured to broadcast information to the communication terminal 1, and supports access function of the communication terminal 1. Communication terminal 1 obtains the application mode supported by the network through the broadcasted information sent by the AP 3, and accesses the network through the application mode supported by the network to communicate. In FIG. 1, the adjacent access network 21 and access network 22 both adopt the access technology a. However, with regard to the application mode, the access network 21 adopts the application mode a1, and the access network 22 adopts the application mode a2. The communication terminal 1 accesses the network through the AP 3. When the mobile device moves, the communication terminal 1 may need to switch from a network to a neighboring network seamlessly. The factors that trigger the handover may be signal strength, Quality of Service (QoS), service level, cost, etc. When the communication terminal 1 performs handover, it needs to discover the neighboring network first. After discovering the application mode of the neighboring network, the communication terminal 1 switches to the target network through a handover policy and algorithm by means of the application-mode adaptive mechanism according to an embodiment of the present disclosure.

Embodiment 1

Figure 2:
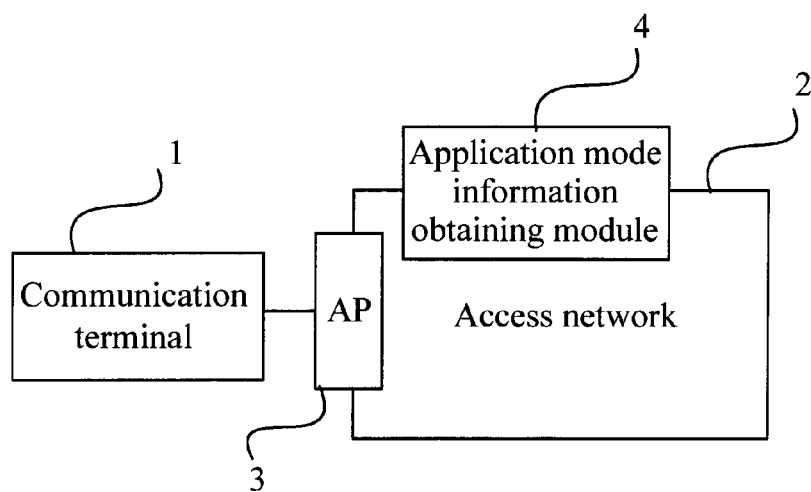
FIG. 2 shows a structure according to a first embodiment of the present disclosure.

FIG. 2 shows a structure according to the first embodiment of the present disclosure. The application mode-adaptive communication system according to this embodiment includes an access network 2 and a communication terminal 1, and further includes: an application mode information obtaining module 4, set in the access network 2 and configured to obtain the information about the application mode supported by the network; and an AP 3, set in the access network 2 and configured to: provide the communication terminal 1 with the application mode information obtained by the application mode information obtaining module 4, wherein the application mode information indicates the application mode supported by the network, and create a communication connection with the communication terminal 1 based on the application mode negotiated and determined according to the information about the application mode supported by the communication terminal 1 and the information about the application mode supported by the network.

The communication terminal 1 is configured to: negotiate and determine the application mode according to the information about the application mode supported by the communication terminal 1 and the information about the application mode supported by the network, and create a communication connection with the network through the determined application mode.

Embodiment 2

Figure 3:
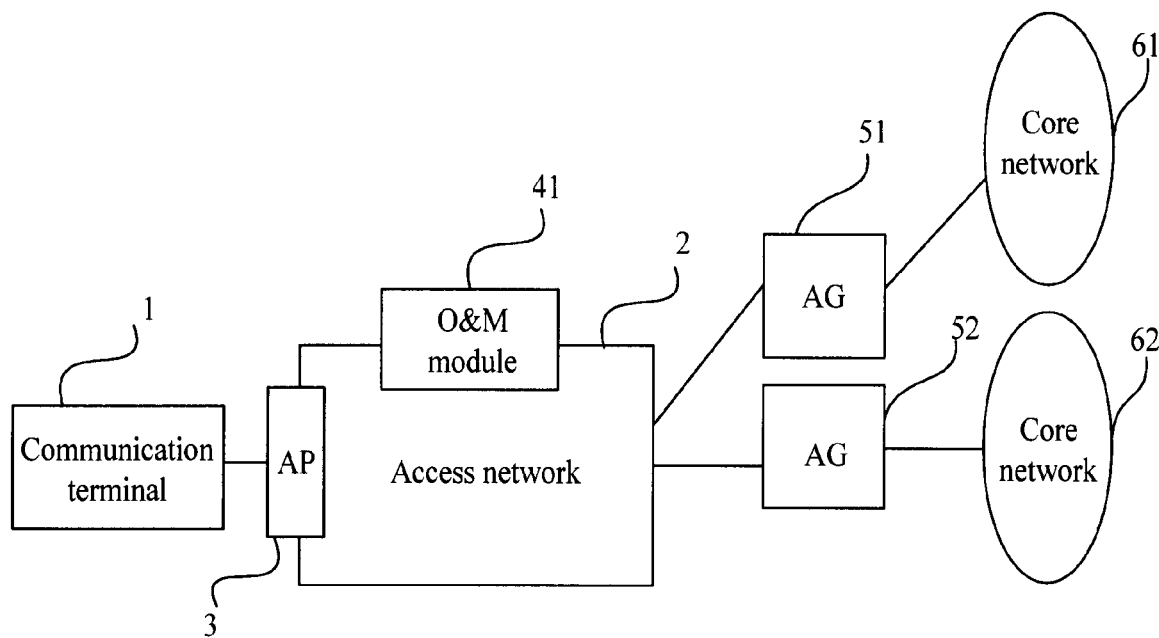
FIG. 3 shows a structure according to a second embodiment of the present disclosure.

FIG. 3 shows a structure according to the second embodiment of the present disclosure. The structure includes: a communication terminal (STA) 1, an access network 2, an Operation and Maintenance (O&M) module 41, core networks 61 and 62, an Access Gateway (AG) 51 connected with the core network 61, and an AG 52 connected with the core network 62. In this embodiment, the AG 51 supports the application mode 1, and the AG 52 supports the application mode 2. The communication terminal 1 is configured to: negotiate and determine the application mode according to the application mode information sent by the access network 2, and create a communication connection with the access network 2. The access network 2 is configured to: select the corresponding AG according to the application mode determined through negotiation, and create a communication connection with the core network corresponding to the access network. The O&M module 41 is connected with the access network 2, and configured to provide the access network 2 with the information about the application mode supported by the AG. In this embodiment, the application mode information obtaining module 4 is the O&M module 41. The access network 2 configures the application mode parameter information of the access network in the broadcast through the O&M module 41 or the AG 51 or 52. The communication terminal 1 may be connected to the AG 51 or 52 through the access network 2 by means of the application mode 1 or 2, and further connected to different core networks.

Embodiment 3

Figure 4:
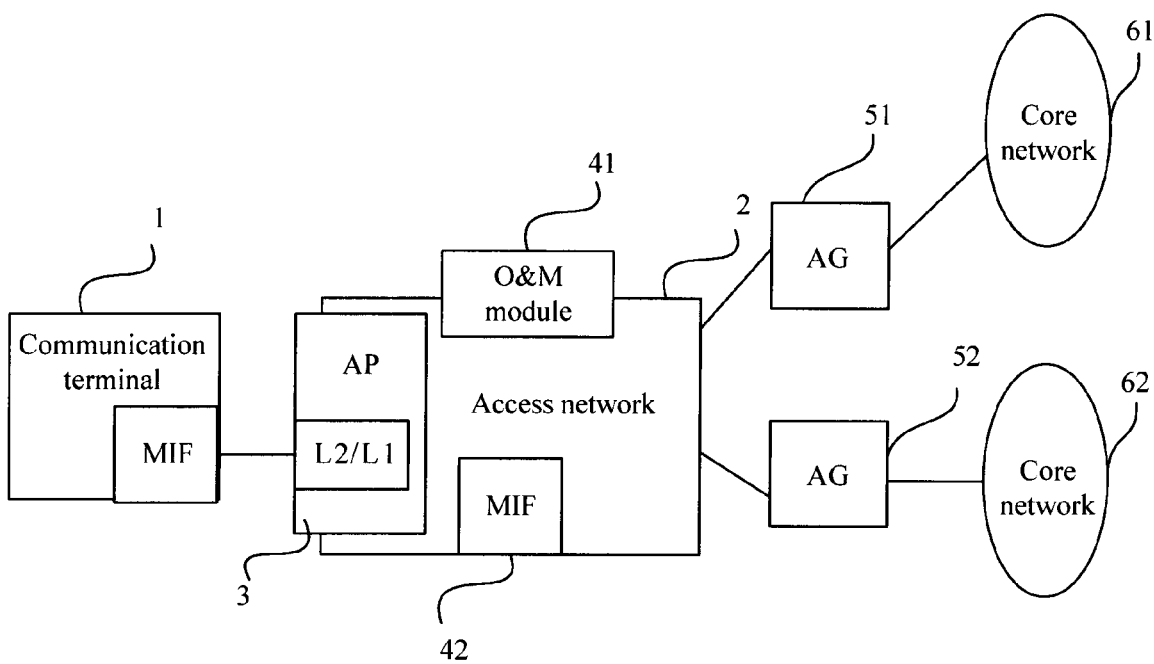
FIG. 4 shows a structure according to a third embodiment of the present disclosure.

FIG. 4 shows a structure according to the third embodiment of the present disclosure. This embodiment differs from the first embodiment in that, the communication terminal 1 and the access network 2 further include a Media Independent Function (MIF), e.g., MIF 42. The MIF 42 in the access network 2 is configured to configure the application mode information of the access network 2. In this embodiment, the application mode information obtaining module 4, as discussed above with respect to FIG. 2, is the MIF 42 in the access network 2. The MIF 42 in the communication terminal 1 creates a communication connection with the MIF 42 in the access network 2 through a communication interface between the link layer (L2) and the physical layer (L1) of the AP 3, and is configured to configure the application mode information of the communication terminal 1. In this embodiment, both the communication terminal 1 and the access network 2 support the MIF, while the AG does not support the MIR The MIF is designed to provide some media-independent control functions so that the terminal and the network may negotiate the application mode information through the MIR. In the system structure shown in FIG. 3, the communication terminal 1 is connected to the access network 2 through a wireless or wired access technology, and accesses the core networks 61 and 62 through the AG 51 or 52 to communicate. The O&M module 41 is a module for configuring the access network 2. One of the functions of the module is to configure a list of parameters of the application mode supported by the access network 2 in the L2 broadcast/unicast packet of the access network 2. This function is implemented through interaction with the MIF 42 of the access network 2.

Embodiment 4

Figure 5:
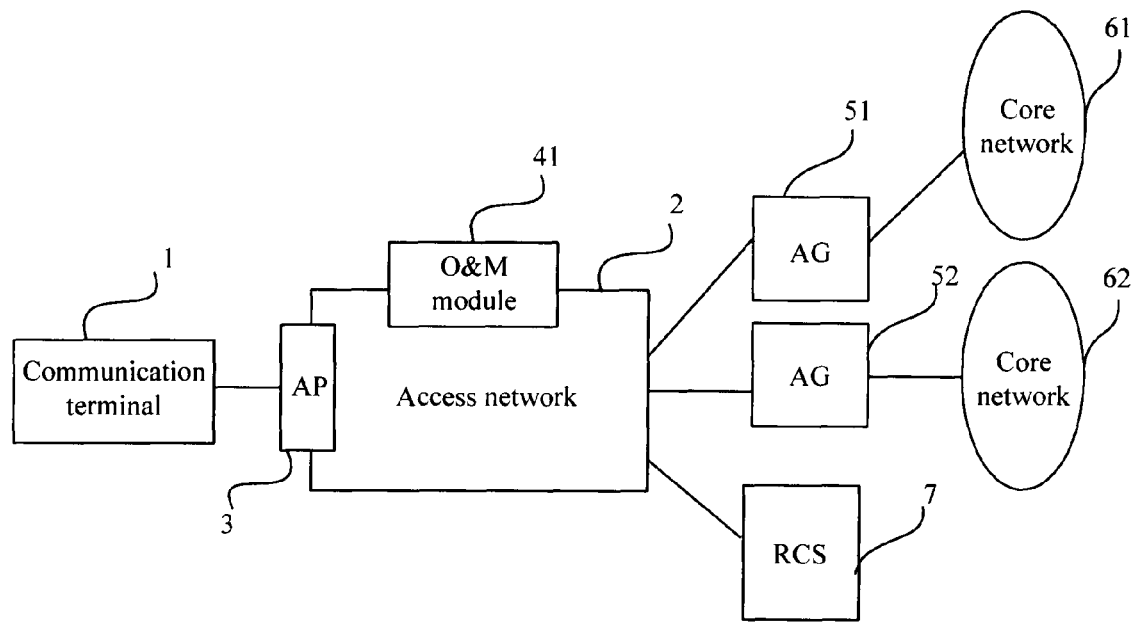
FIG. 5 shows a structure according to a fourth embodiment of the present disclosure.

FIG. 5 shows a structure according to the fourth embodiment of the present disclosure. On the basis of the first and second embodiments, the fourth embodiment may further include a Reconfiguration Server (RCS) 7. The RCS 7 is connected with the access network 2, and is configured to reconfigure the application mode of the communication terminal 1. When the terminal does not support the application mode of the access network 2, the application mode may be reconfigured for the terminal through the RCS 7.

Embodiment 5

Figure 6:
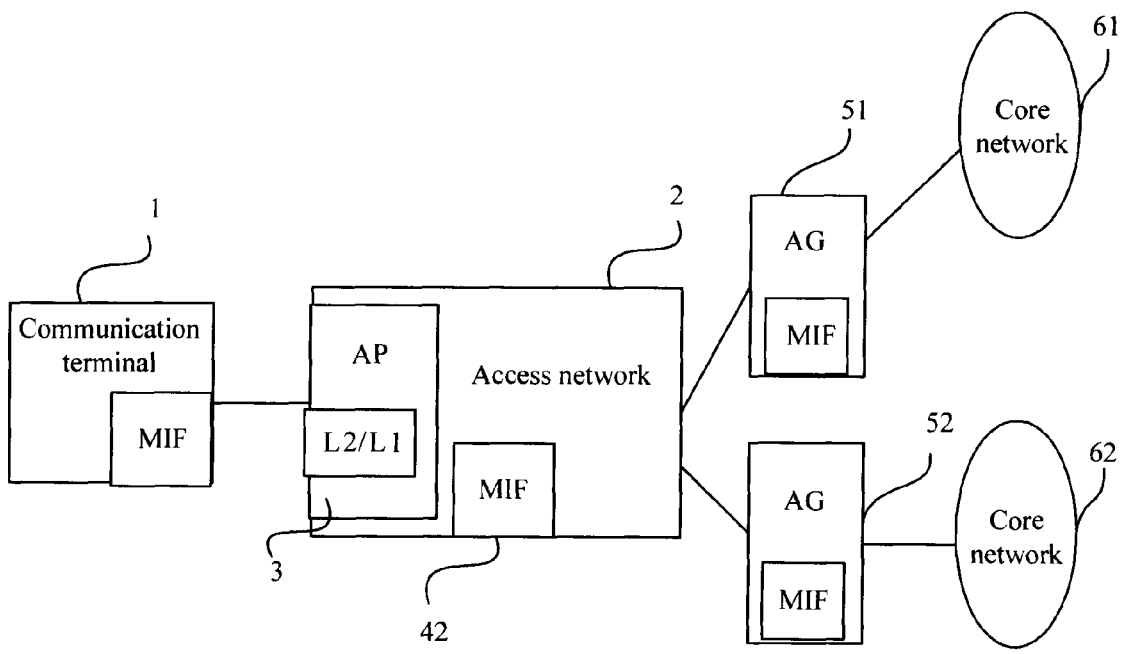
FIG. 6 shows a structure according to a fifth embodiment of the present disclosure.

FIG. 6 shows a structure according to the fifth embodiment of the present disclosure. The structure includes: communication terminal 1, access network 2, AGs 51 and 52, and core networks 61 and 62. The communication terminal 1 is configured to: negotiate and determine the application mode according to the application mode information sent by the access network 2, and create a communication connection. The access network 2 is connected with the communication terminal 1, and configured to: select the AG 51 or 52 according to the application mode determined through negotiation, and create a communication connection with the core network 61 or 62. A MIF is set in the communication terminal 1, AG 51 or 52, and the AP 3 of the access network 2 respectively. The MIF in the access network 2 is configured to configure the application mode information of the access network 2. The MIF in the communication terminal 1 is connected with the MIF 42 in the access network 2, and is configured to configure the application mode information of the communication terminal 1. The MIF in the AG 51 or 52 is connected with the MIF in the access network 2, and is configured to provide the access network 2 with the information about the application mode supported by the access gateway. In this embodiment, the application mode information obtaining module is the MIF 42 in the access network 2. In this way, if the AG supports the MIF, the application mode parameters of a broadcast/unicast packet of the access network 2 may be configured through interaction between the MIF of the AG 51 or 52 and the MIF of the access network 2.

Embodiment 6

Figure 7:
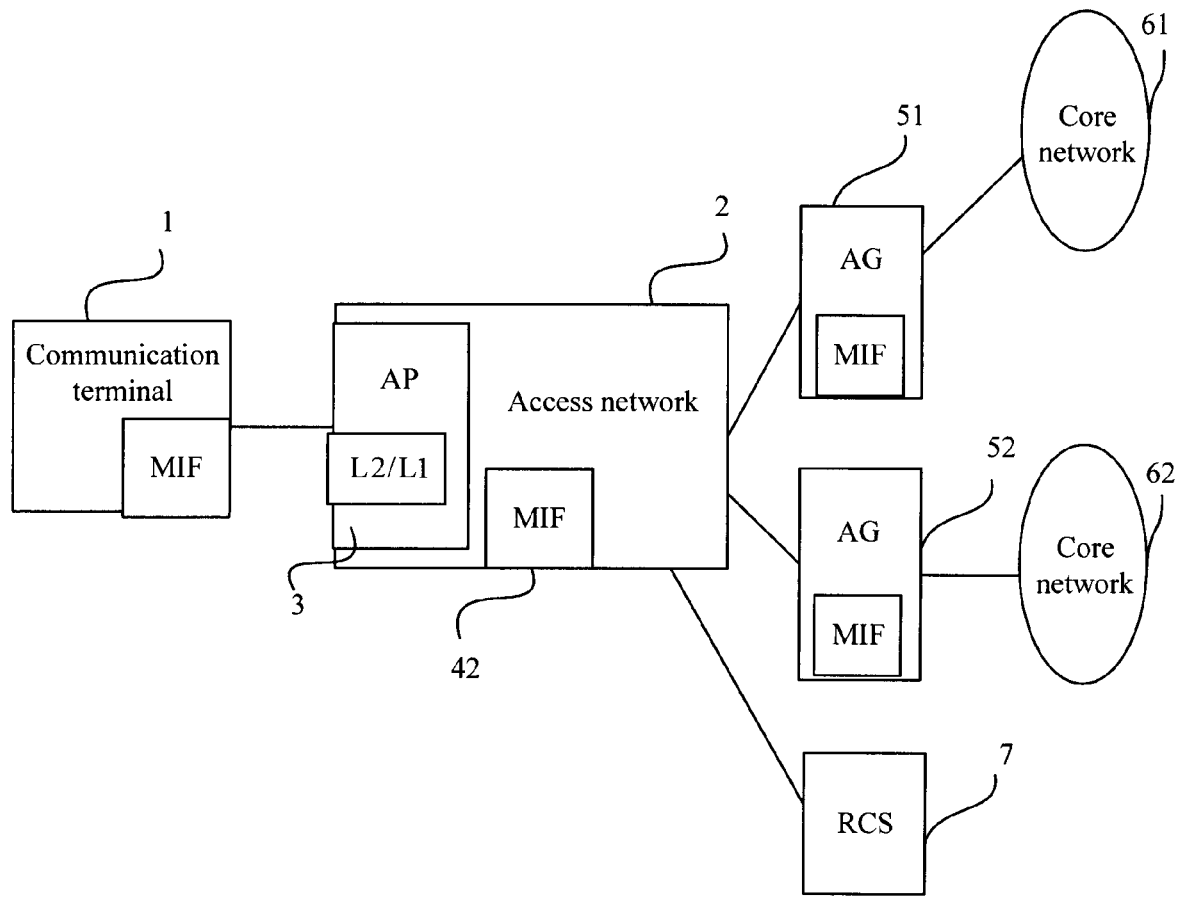
FIG. 7 shows a structure according to a sixth embodiment of the present disclosure.

FIG. 7 shows a structure according to the sixth embodiment of the present disclosure. This embodiment differs from the fifth embodiment in that, the sixth embodiment further includes an RCS 7. The RCS 7 is connected with the access network 2 for communication, and is configured to reconfigure the application mode of the communication terminal 1. When the terminal does not support the application mode of the access network 2, the application mode may be reconfigured for the terminal through the RCS 7.

Embodiment 7

Figure 8:
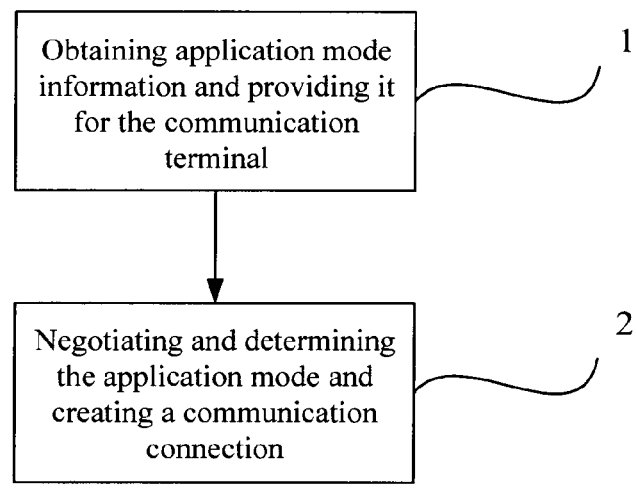
FIG. 8 is a flowchart according to a seventh embodiment of the present disclosure.

FIG. 8 is a flowchart according to the seventh embodiment of the present disclosure. The communication method adaptive to the application mode in this embodiment includes the following blocks:

Block 1: Obtaining the information about the application mode supported by the network, and providing the information for the communication terminal 1.

In this block, there are two approaches for providing the information about the application mode supported by the network for the communication terminal 1, namely, two approaches for the communication terminal 1 to obtain the information about the application mode supported by the network:

Approach 1: Communication terminal 1 obtains the information about the application mode supported by the network from the network broadcast, and the access network 2 may broadcast the information about the application mode supported by the network to the communication terminal 1 through a communication interface between the link layer and physical layer; the broadcast packet sent by the network includes an option of the information about the application mode supported by the network, and the communication terminal 1 obtains the information about the application mode supported by the network passively by receiving the broadcast packet of the network. This approach requires the broadcast packet of the network to include an additional option about the application mode supported by the network, and requires the communication terminal 1 to identify the option.

Approach 2: The communication terminal 1 sends a request of querying the application mode to the network. In response to the request, the network returns information about the application mode supported by the network to the mobile terminal 1. The details are as follows: The communication terminal 1 sends a broadcast network scan packet to the access network 2. After receiving the network scan packet, the MIF 42 in the access network 1 triggers unicast or broadcast, and sends application mode information to the communication terminal 1 through a communication interface between the link layer and physical layer. Through this approach, the communication terminal 1 initially sends a packet to the network querying the application mode. In response to the packet, the network replies with a packet returning the information about the application mode supported by the network to the communication terminal 1. The communication terminal 1 obtains the information about the application mode supported by the network by receiving the reply packet. This approach requires the network to add a group of packets, through which the communication terminal 1 sends a request to the network querying the application mode, and the network returns the information about the application mode supported by the network to the communication terminal 1.

Block 2: Creating a communication connection between the communication terminal 1 and the network based on the application mode negotiated and determined by the communication terminal 1 after the communication terminal 1 negotiates and determines the application mode according to the information about the application mode supported by the communication terminal 1 and the information about the application mode supported by the network.

After the communication terminal 1 receives the information about the application mode supported by the network, the block may further include the following: determining whether the application modes supported by the communication terminal 1 include an application mode that matches the application mode supported by the network. If the application modes supported by the communication terminal 1 include an application mode that matches the application mode supported by the network, the communication terminal 1 negotiates and determines the application mode according to the information about the application mode supported by the communication terminal and the information about the application mode supported by the network. Otherwise, after the communication terminal 1 is reconfigured, the communication terminal 1 negotiates and determines the application mode according to the information about the application mode supported by the communication terminal 1 and the information about the application mode supported by the network.

When the communication terminal 1 negotiates and determines the application mode according to the information about the application mode supported by the communication terminal and the received information about the application mode supported by the network, if the application modes supported by the communication terminal 1 does not include the application mode available to the communication, the communication terminal 1 may be reconfigured, and then the communication terminal 1 creates a communication connection with the network by using the application mode determined through negotiation.

After the communication terminal 1 receives the information about the application mode supported by the network, the block may further include the following: determining whether the application modes supported by the communication terminal 1 include the application mode that matches the application mode supported by the network. If the application modes supported by the communication terminal 1 include the application mode that matches the application mode supported by the network, the communication terminal 1 negotiates and determines the application mode according to the information about the application mode supported by the communication terminal and the information about the application mode supported by the network; otherwise, the communication terminal 1 is reconfigured and then restarted.

When the communication terminal 1 negotiates and determines the application mode according to the information about the application mode supported by the communication terminal and the received information about the application mode supported by the network, if the application modes supported by the communication terminal 1 does not include an application mode available to the communication, the communication terminal 1 may be reconfigured and then restarted.

Moreover, because a reconfiguration mechanism is introduced, even if the application modes supported by the communication terminal 1 does not include an application mode that matches the application mode supported by the network, negotiation can be still performed, and the negotiation result is recorded. After the communication terminal 1 is reconfigured, the application mode switches to the negotiated application mode.

The details of the reconfiguration operation are as follows: The communication terminal 1 downloads the data about the application mode supported by the network from the RCS 7, and configures the application mode supported by the network into the communication terminal 1. Moreover, if a negotiation result is recorded, the communication terminal 1 needs to download the data about the application mode determined through negotiation from the RCS 7.

Before block 1, an operation of initializing the application mode configuration may be included. This operation varies with different network systems.

In the case where an MIF is set in both the access network 2 and the AG, this operation may be as follows: The MIF in the AG sends the application mode configuration information to the MIF 42 of the access network 2, and the MIF 42 of the access network 2 configures the access mode parameter in the broadcast packet in the access network.

In the case that a MIF is set in the AG in the network system and an O&M module 41 is configured in the system, this operation may be as follows: The O&M module 41 configures the information about the application mode supported by the High Layer Function (HLF) in the AG into the MIF 42 of the access network 2, and the MIF 42 configures the access mode parameter in the broadcast packet in the access network 2.

The operation of initializing the application mode configuration occurs not only at the network side, but also at the communication terminal 1: The HLF of the communication terminal 1 configures the information about the application mode supported by the communication terminal 1 into the MIF of the communication terminal 1.

Figure 9:
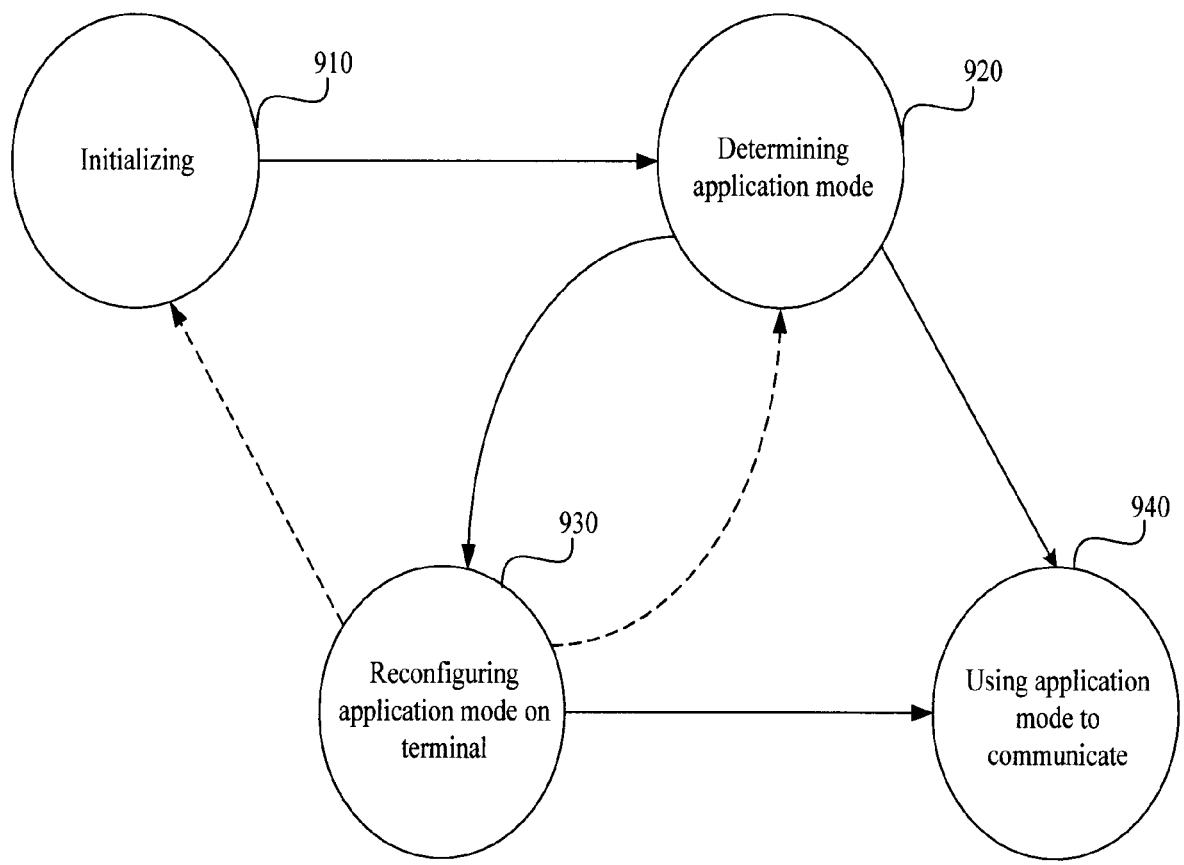
FIG. 9 is a state transition diagram of a communication method adaptive to the application mode according to an embodiment of the present disclosure.

An embodiment of the present disclosure may be illustrated through a complete state diagram. FIG. 9 is a state transition diagram of the communication method adaptive to the application mode according to an embodiment of the present disclosure. There are four states in total: "initializing" 910, "determining application mode" 920, "reconfiguring application mode on terminal" 930, and "using application mode to communicate" 940.

"Initializing" 910 is a state when the terminal and network perform parameter configuration; "determining application mode" 920 is a state when the terminal negotiates the application mode according to a certain policy or algorithm; "reconfiguring application mode on terminal" 930 is a state when the terminal reconfigures the application mode not supported by the terminal; and "using application mode to communicate" 940 is a state when the terminal configures the application mode and communicates based on the application mode.

The state is "initializing" 910 when the terminal is powering on, restarting or resetting the communication terminal 1. In the "initializing" 910 stage, both the communication terminal 1 and the network need to perform the initialization operation. Terminal initialization means that the HLF of the terminal notifies the list of application modes supported by the terminal to the application mode negotiating module. Network initialization means that the network configures the value of the application mode parameter in the broadcast packet. After the terminal receives the broadcast packet which is sent by the network and includes an application mode, or after the terminal sends a request of querying the application mode to the network and identifies the application mode supported by the network through the reply packet received from the network, the "determining application mode" 920 state occurs.

In the stage of "determining application mode" 920, the terminal determines the application mode used by the access network of the terminal according to a certain policy or algorithm in light of the information about the application mode supported by the terminal and the information about the application mode supported by the network. If the terminal supports the determined application mode, the state shifts to "using application mode to communicate" 930; if the terminal does not support the determined application mode, the state shifts to "reconfiguring application mode on terminal" 940.

In the stage of "reconfiguring application mode on terminal" 930, the terminal is connected with layer 2 of the network first to trigger the reconfiguration process of the terminal. The "reconfiguring application mode on terminal" 930 comes in many modes. Through the reconfiguration process, the terminal downloads the data about supported application modes from the RCS 7. The state after completion of downloading comes in three circumstances.

Circumstance 1: The application mode needs restart of the terminal. During restart of the terminal, the application mode is operated, and the state shifts to "initializing" 910.

Circumstance 2: When the terminal reconfigures the application mode, the terminal does not memorize the negotiation result in the determined application mode state, and the state shifts to "determining application mode" 920.

Circumstance 3: When the terminal configures the application mode, the terminal memorizes the negotiation result in the determined application mode state, and the state shifts to "using application mode to communicate" 940.

In the stage of "using application mode to communicate" 940, the terminal configures the corresponding application mode, creates a connection with the network, and uses the application mode to communicate.

Embodiment 8

Figure 10:
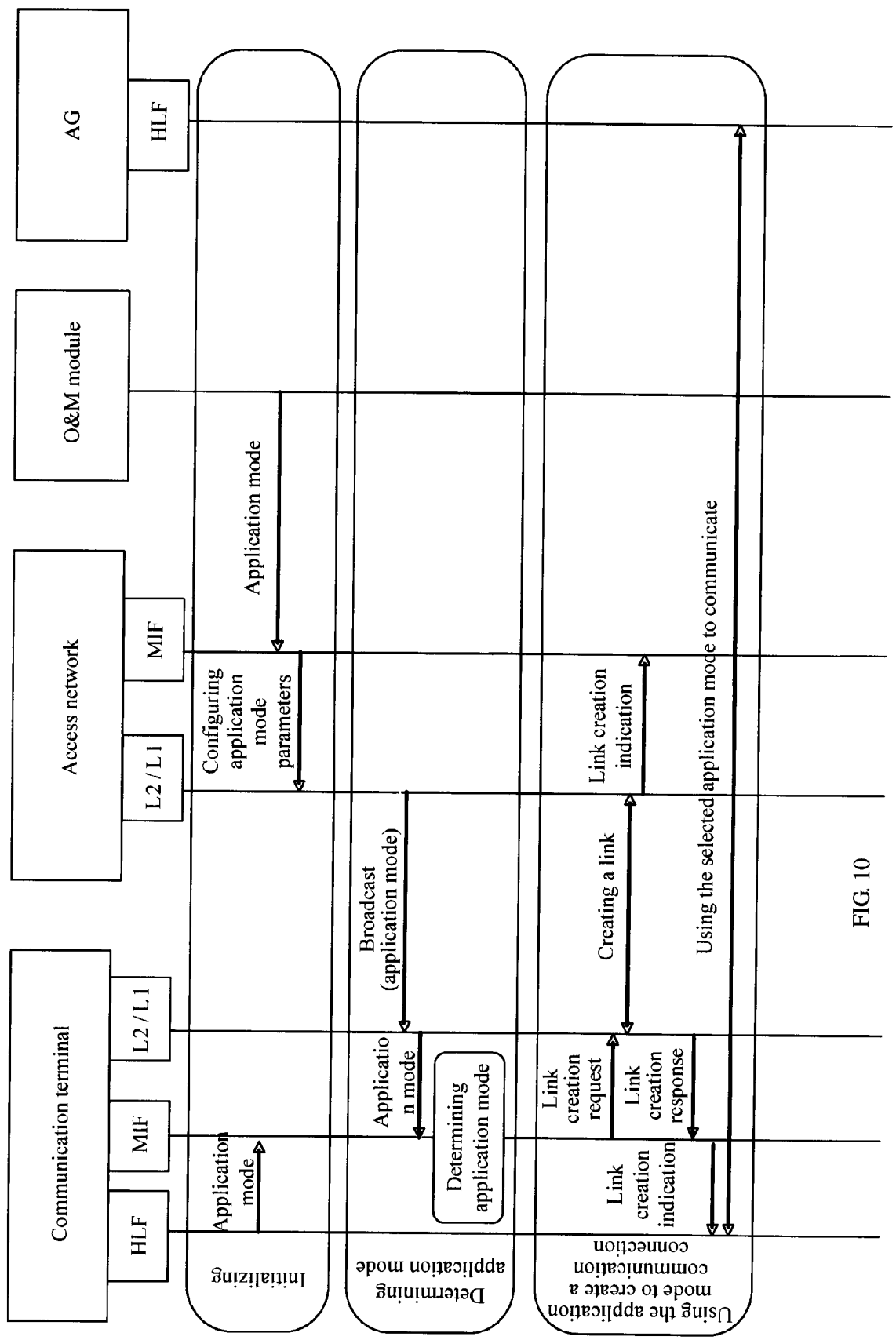
FIG. 10 is a signaling flowchart according to an eighth embodiment of the present disclosure.

FIG. 10 is a signaling flowchart according to the eighth embodiment of the present disclosure. In this embodiment, the communication terminal and the access network support the MIF, while the AG does not support the MIF. An O&M module is set in the network, and the communication terminal obtains the application mode information from the network broadcast.

At the initialization stage, the HLF of the communication terminal configures the information about the application mode supported by the communication terminal into the MIF; the O&M module in the access network configures the information about the application mode supported by the HLF in the AG into the MIF of the access network; and the MIF of the access network configures the access mode parameters in the broadcast packet in the access network. After the communication terminal receives the broadcast packet carrying the application mode information from the access network, the communication interface between the link layer and the physical layer of the communication terminal identifies the list of application modes supported by the network according to the received broadcast, and the state shifts to "determining application mode" 920. The MIF of the communication terminal determines the application mode supported by both the terminal and the network through a certain policy or algorithm according to the information about the application mode supported by the communication terminal and the information about the application mode supported by the network. After the application mode is determined, the state shifts to "using application mode to communicate" 940. The MIF of the communication terminal sends a link creation request to the communication interface between the link layer and physical layer, and then a link is created between the communication terminal and the access network. After a link is created between the communication terminal and access network, the communication interface between the link layer and physical layer of the communication terminal sends a link creation response to the MIF of the communication terminal. The MIF of the communication terminal sends a link creation indication to the HLF of the communication terminal. The communication interface between the link layer and physical layer of the access network sends a link creation indication to the MIF of the access network. In this way, the communication terminal may be connected to the AG through the access network and use the determined application mode to communicate.

Embodiment 9

Figure 11:
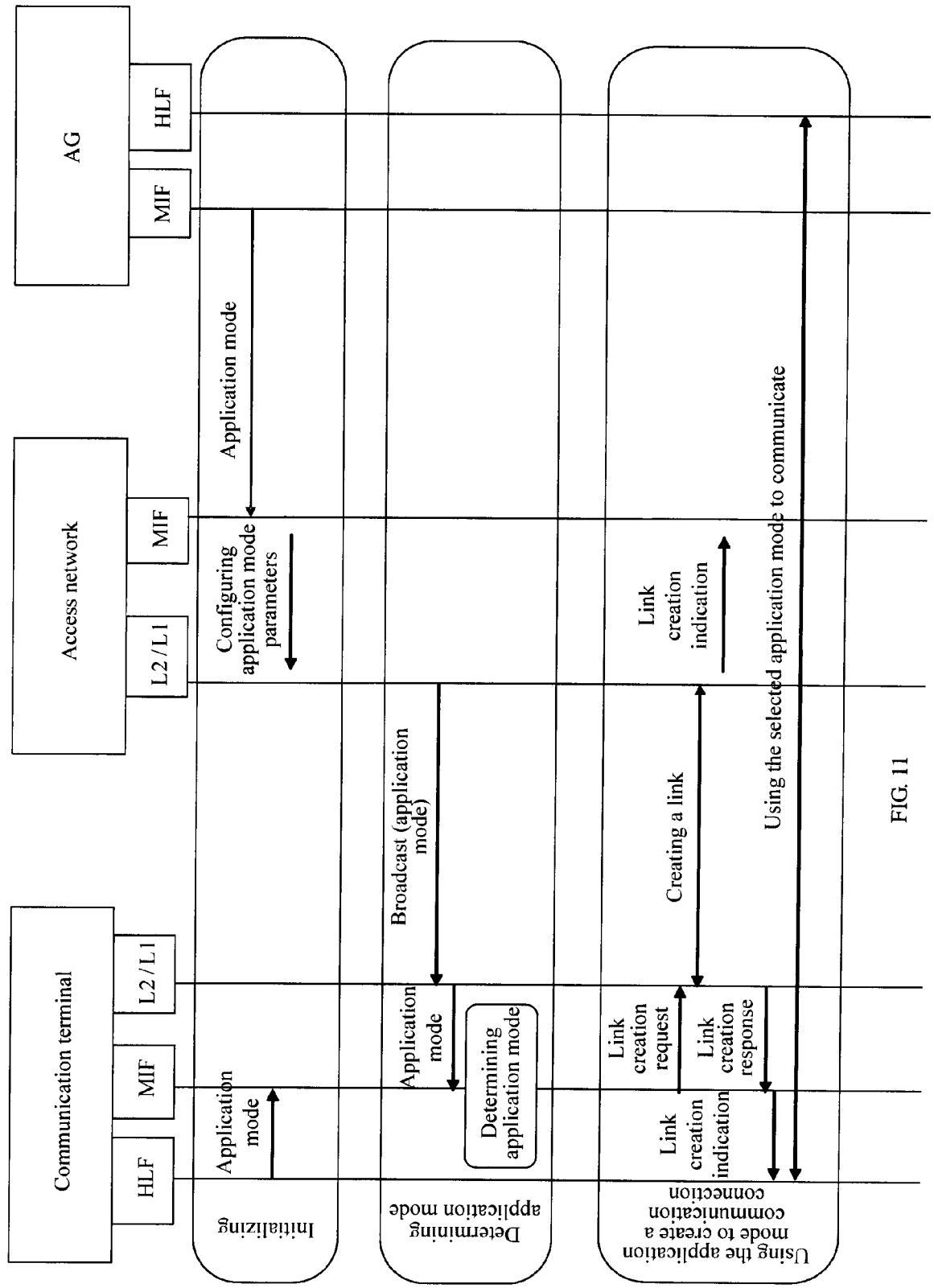
FIG. 11 is a signaling flowchart according to a ninth embodiment of the present disclosure.

FIG. 11 is a signaling flowchart according to the ninth embodiment of the present disclosure. In this embodiment, the communication terminal, access network, and AG support the MIF, and the communication terminal obtains the application mode information from the network broadcast.

At the initialization stage, the HLF of the communication terminal configures the information about the application mode supported by the communication terminal into the MIF of the communication terminal; the MIF of the AG sends the application mode configuration information to the MIF of the access network, and the MIF of the access network configures the access mode parameters in the broadcast packet in the access network. The process of determining the application mode and using the application mode to communicate in FIG. 11 is the same as the process in FIG. 10.

Embodiment 10

Figure 12:
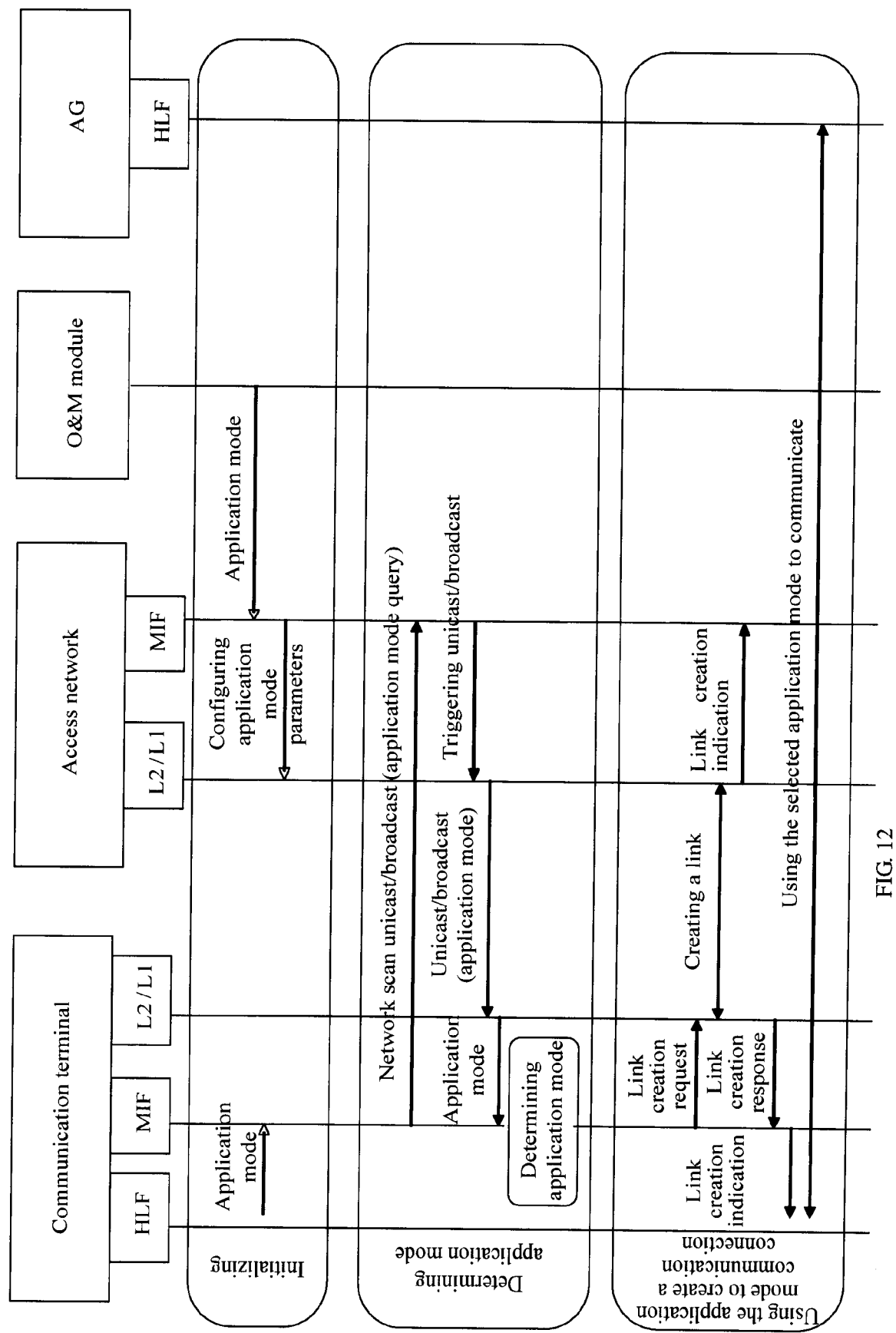
FIG. 12 is a signaling flowchart according to a tenth embodiment of the present disclosure.

FIG. 12 is a signaling flowchart according to the tenth embodiment of the present disclosure. In this embodiment, the communication terminal and access network support the MIF, while the AG does not support the MIF, and the communication terminal obtains the application mode information of the network through message interaction. The initialization process in FIG. 12 is the same as the initialization process in FIG. 10. At the stage of determining the application mode, if the communication terminal knows the network location beforehand, the MIF of the communication terminal sends a unicast network scan packet; if the communication terminal does not know the network location, the MIF of the communication terminal sends a broadcast network scan packet. The network scan packet carries an application mode query option. After receiving the network scan packet, the MIF of the network triggers unicast or broadcast. The unicast or broadcast packet sent by the network carries the information about the application mode supported by the network. After the communication terminal receives the unicast or broadcast packet carrying the application mode information from the access network, the communication interface between the link layer and physical layer of the communication terminal identifies the list of application modes supported by the network according to the received packet. The MIF of the communication terminal determines the application mode supported by both the terminal and the network through a certain policy or algorithm according to the information about the application mode supported by the communication terminal and the information about the application mode supported by the network. After the application mode is determined, the state shifts to "using application mode to communicate" 940. The process of using the application mode to communicate in FIG. 12 is the same as the process in FIG. 9.

Embodiment 11

Figure 13:
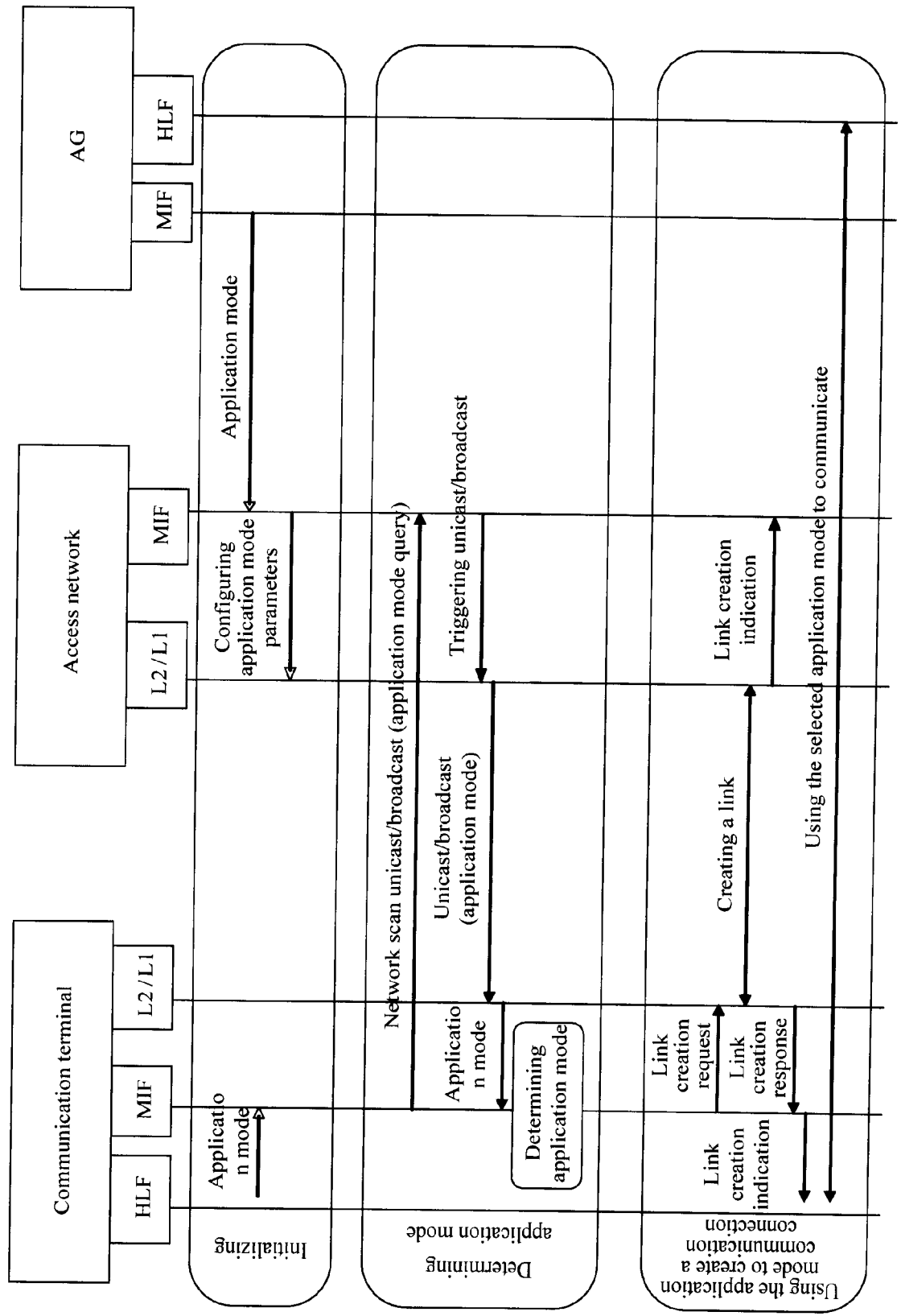
FIG. 13 is a signaling flowchart according to an eleventh embodiment of the present disclosure.

FIG. 13 is a signaling flowchart of the eleventh embodiment of the present disclosure. In this embodiment, the communication terminal, access network, and AG support the MIF, and the communication terminal obtains the application mode information of the network through message interaction.

The initialization process in FIG. 13 is the same as the initialization process in FIG. 11, the process of determining the application mode in FIG. 13 is the same as the process of determining the application mode in FIG. 11, and the process of using the application mode to communicate in FIG. 13 is the same as the process of using the application mode to communicate in FIG. 10.

Embodiment 12

Figure 14:
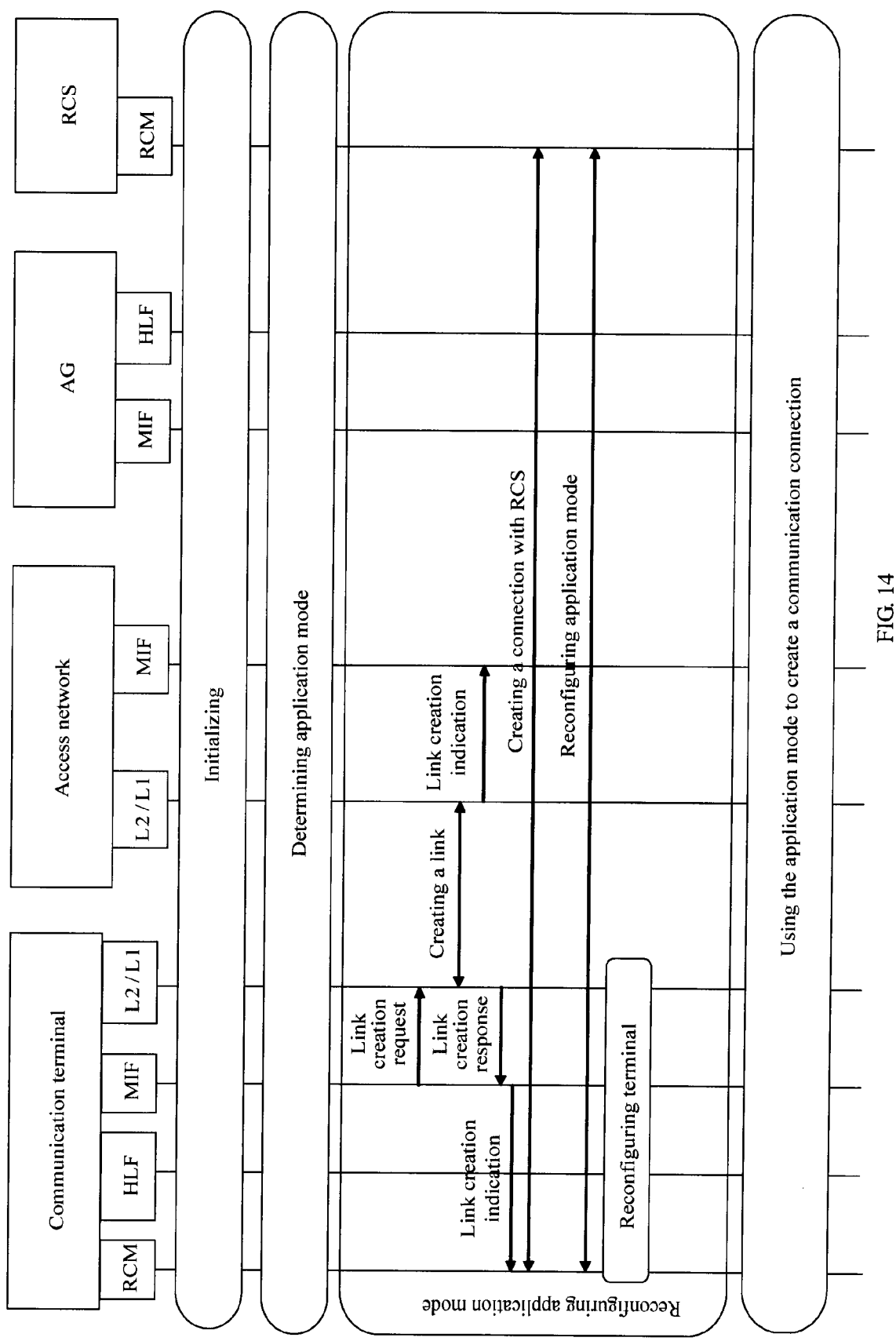
FIG. 14 is a signaling flowchart according to an twelfth embodiment of the present disclosure.

FIG. 14 is a signaling flowchart of the twelfth embodiment of the present disclosure. In this embodiment, the terminal device, access network, and AG support the MIF, and the network further includes an RCS. After the communication terminal finishes determining the application mode, as discussed above in connection with FIGS. 10-13, if the communication terminal does not support the application mode determined through negotiation, the communication terminal initiates an application mode reconfiguration process.

After the initialization process and the process of determining the application mode in FIG. 14, if the MIF of the communication terminal finds that the communication terminal does not support the application mode determined through negotiation, the MIF sends an application mode reconfiguration request to the Reconfiguration Module (RCM) of the communication terminal, and the state shifts to "reconfiguring application mode on terminal" 930. First, the MIF of the communication terminal sends a link creation request to the communication interface between the link layer and physical layer of the communication terminal, and then a link is created between the communication terminal and the access network. Then the communication interface between the link layer and physical layer of the communication terminal sends a link creation response to the MIF of the communication terminal. The MIF of the communication terminal sends a link creation indication to the RCM of the communication terminal, and the communication interface between the link layer and physical layer of the access network sends a link creation indication to the MIF of the access network. According to the link created between the communication terminal and access network, the communication terminal obtains a temporary IP address through a Dynamic Host Configuration Protocol (DHCP) or by other means, and then creates a connection with the RCS. In this way, the RCM of the communication terminal sends a request of reconfiguring the application mode to the RCM of the RCS. After receiving the request, the RCM of the RCS sends the protocol information of the application mode to the communication terminal. After receiving the protocol information of the application mode, the communication terminal configures the application mode. After the configuration succeeds, the state shifts to "initializing" 910, "determining application mode" 920 or "using application mode to communicate" 930, as the case may be. In this embodiment, the reconfiguration process is not affected no matter whether the AG supports the MIF or not.

Figure 15:
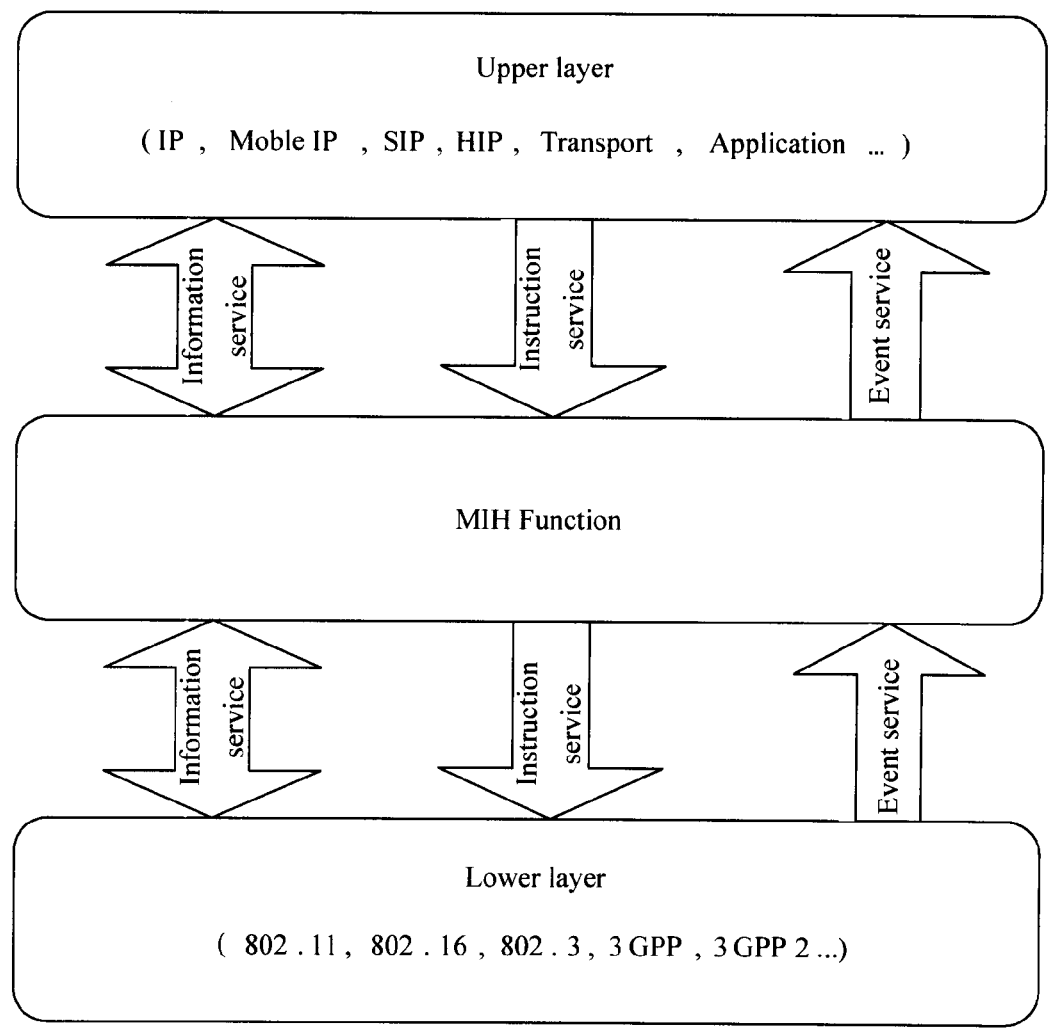
FIG. 15 is a schematic diagram of a Media Independent Handover Function (MIHF) according to an embodiment of the present disclosure.

In all embodiments of the present disclosure, the MIF may be implemented through a Media Independent Handover Function (MIHF) defined by an IEEE 802.21-based media independent handover service standard. FIG. 15 is a schematic diagram of the MIHF principle according to an embodiment of the present disclosure. The MIHF defined in the IEEE 802.21 provides the media independent event services, instruction service and information service so that the terminal device can detect the available network in the current environment optimally. The foregoing three services collect the information related to the physical layer and Media Access Control (MAC) sub-layer protocol by defining the relevant primitives and media-dependent MIH_link_SAP service points, and provide information for the MIHF upper layers through the media-independent MIH_SAP service points. Information interaction is performed between the MIHF modules through the media-independent MIH_NET_SAP service points. The lower layers of the MIHF include the communication interface layer between the link layer and the physical layer based on various media-dependent access technologies, and the upper layers of the MIHF include L3 and upper entities which support network discovery, network selection and handover control. In the foregoing embodiment, the HLF and RCM may be regarded as upper layers of the MIHF, and the MIF may be regarded as MIHF. In this way, the functions of the MIF may be implemented through the MIHF in the process shown in FIG. 13. In the "initializing" 910 state in FIG. 13, the application mode information interaction between the MIHF of the AG and the MIHF of the access network may be implemented through the "MIH_get_information.request (indication, response, confirm)" primitive. The application mode may be configured by adding a primitive of configuring the application mode according to the standard. In the "determining application mode" 920 state, the terminal scans the network through the "MIH_scan.request (response)" which is mapped by the MIHF to the media-dependent network scan primitive through the "MIH_link_SAP". In the "using application mode to communicate" 940 state, the link creation request may be implemented through a media-dependent primitive; and the link creation indication may be implemented through a "link_up.Indication" primitive and an "MIH_link_up.indication" primitive.

Embodiment 13

Figure 16:
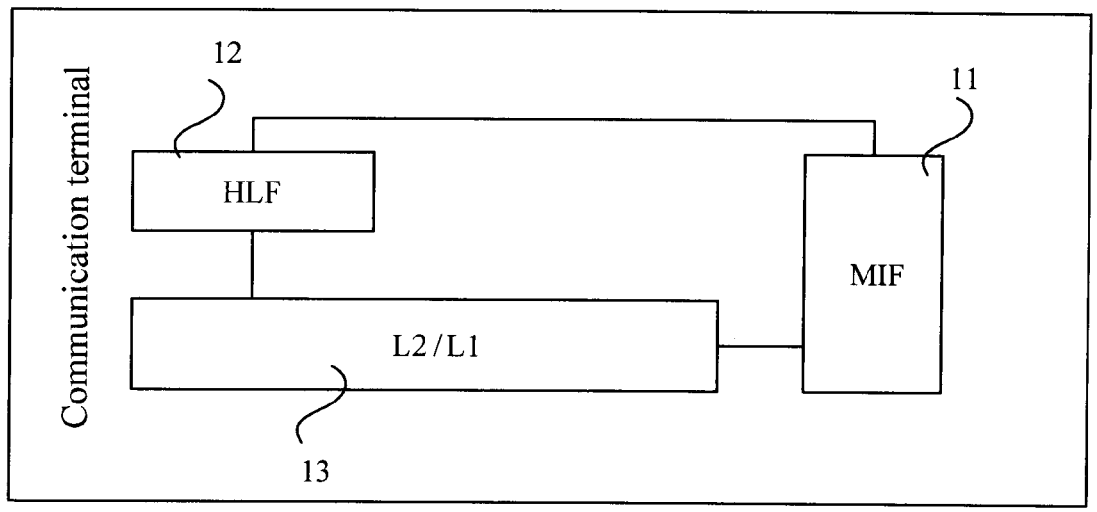
FIG. 16 shows a structure according to a thirteenth embodiment of the present disclosure.

FIG. 16 shows a structure of the thirteenth embodiment of the present disclosure. This embodiment is about a communication terminal adaptive to the application mode. The communication terminal includes: a communication interface 13 between the link layer (L2) and physical layer (L1), configured to provide the communication connection between the link layer and physical layer of the access network and receive the application mode information; a MIF 11, connected with the communication interface between the link layer and the physical layer, and configured to negotiate and determine the application mode according to the information about the application mode supported by the communication terminal and the information about the application mode supported by the network; and an HLF 12, connected with the MIF and the communication interface between the link layer and physical layer, and configured to create a communication connection with the network according to the application mode determined through negotiation.

Embodiment 14

Figure 17:
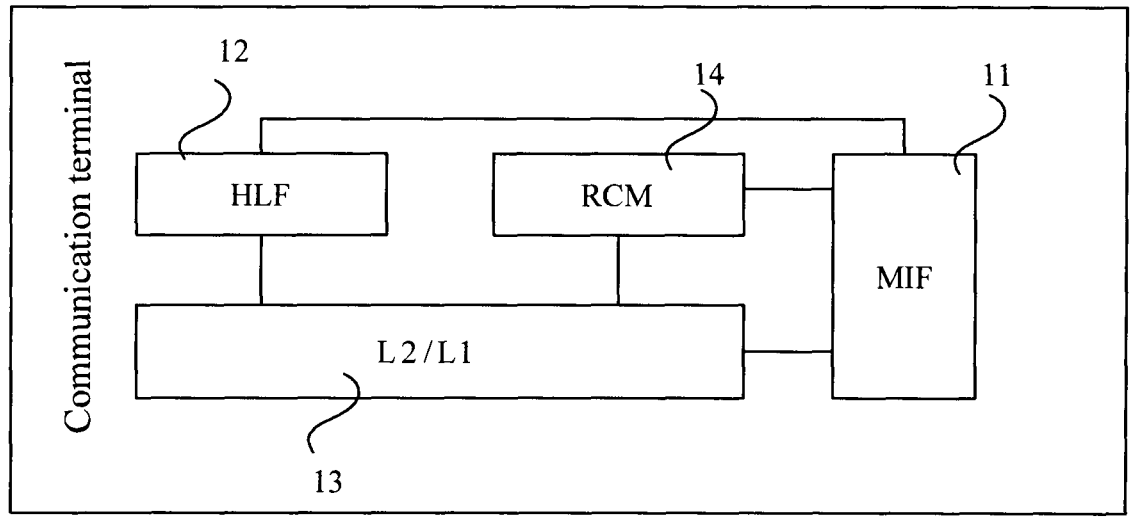
FIG. 17 shows a structure according to a fourteenth embodiment of the present disclosure.

As shown in FIG. 17, embodiment 14 differs from embodiment 13 in that: The communication terminal may further include: an RCM 14, connected with the MIF 11 and the communication interface 13 between the link layer and the physical layer, and configured to reconfigure the application mode of the communication terminal.

Embodiment 15

Figure 18:
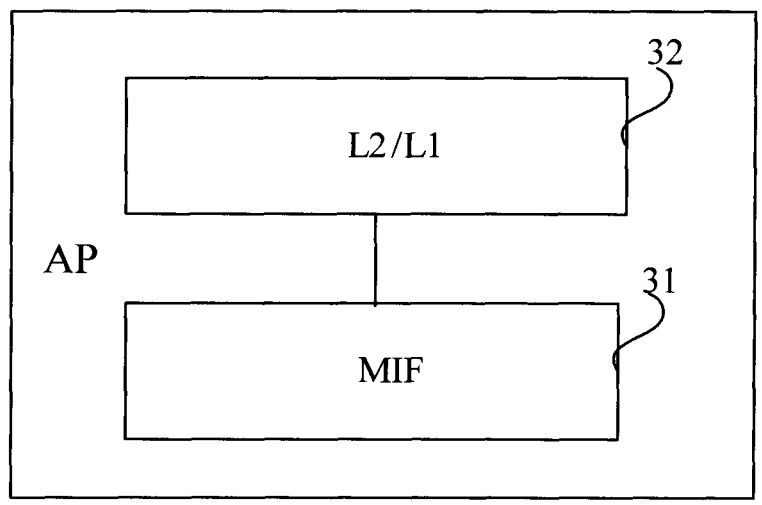
FIG. 18 shows a structure according to a fifteenth embodiment of the present disclosure.

FIG. 18 shows a structure of embodiment 15. This embodiment is about an AP adaptive to the application mode. The AP includes: an application mode information obtaining module 31 (MIF in this embodiment), configured to obtain the information about the application mode supported by the network; and a communication interface module 32 (L2-L1 interface in this embodiment), connected with the application mode information obtaining module 31, and configured to: send the information about the application mode supported by the network to the interface of the communication terminal 1, and provide an interface to create communication between the communication terminal 1 and the network after the communication terminal 1 negotiates and determines the application mode according to the information about the application mode supported by the network and the information about the application mode supported by the communication terminal 1.

The coding method of the application mode in embodiments of the present disclosure is similar to the coding method such as text-based coding and binary coding method.

1. Text-based coding: The application mode coded through texts is simple, where a string (for example, "I-WLAN", "UMA") is directly used as a value in the application mode option.

2. Binary coding method: Binary coding of the application mode needs to be defined by an organization uniformly to prevent ambiguity.

Although the disclosure is described through some exemplary embodiments, the disclosure is not limited to such embodiments. It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents.

What is claimed is:

1. An adaptive communication method, comprising:
obtaining information about an application mode supported by a network, and providing the information for a communication terminal, wherein the application mode is indicative of a mode of coupling between access layer technology and non-access layer technology; and
creating communication connection between the communication terminal and the network based on the application mode negotiated and determined by the communication terminal after the communication terminal negotiates and determines the application mode according to information about the application mode supported by the communication terminal and information about the application mode supported by the network, if application modes supported by the communication terminal comprise no application mode available, reconfiguring the communication terminal,
wherein, after the communication terminal obtains the information about the application mode supported by the network, the method further comprises:
determining whether the application modes supported by the communication terminal comprise an application mode that matches the application mode supported by the network:
if the application modes supported by the communication terminal comprise an application mode that matches the application mode supported by the network, negotiating and determining, by the communication terminal, the application mode according to the information about the application mode supported by the communication terminal and the information about the application mode supported by the network;
otherwise, negotiating and determining the application mode according to the information about the application mode supported by the communication terminal and the information about the application mode supported by the network after the communication terminal is reconfigured.

2. The adaptive communication method of claim 1, wherein the communication terminal negotiating and determining the application mode according to the information about the application mode supported by the communication terminal and the information about the application mode supported by the network comprises:
reconfiguring the communication terminal, if the application mode supported by the communication terminal comprises no application mode available; and creating, by the communication terminal, communication connection with the network by using the application mode determined through negotiation.

3. The adaptive communication method of claim 2, wherein reconfiguring the communication terminal comprises:
    downloading, by the communication terminal, data about the application mode determined through negotiation from a Reconfiguration Server, RCS, and configuring the application mode into the communication terminal.

4. The adaptive communication method of claim 2, wherein reconfiguring the communication terminal comprises:
    downloading, by the communication terminal, data about the application mode supported by the network from a Reconfiguration Server, RCS, and configuring the application mode supported by the network into the communication terminal.

5. The adaptive communication method of claim 1, wherein reconfiguring the communication terminal comprises:
    downloading, by the communication terminal, data about the application mode supported by the network from a Reconfiguration Server, RCS, and configuring the application mode supported by the network into the communication terminal.

6. The adaptive communication method of claim 1, wherein the modes of providing the information about the application mode supported by the network for the communication terminal comprise:
    providing the information about the application mode supported by the network for the communication terminal through network broadcast.

7. The adaptive communication method of claim 1, wherein the modes of providing the information about the application mode supported by the network for the communication terminal comprise:
    returning the information about the application mode supported by the network to a mobile terminal according to a request of querying the application mode sent by the communication terminal.

8. The adaptive communication method of claim 1, further comprising:
    initializing the application mode of the network; or
    initializing the application mode of the communication terminal.

9. The adaptive communication method of claim 8, wherein:
    the initializing the application mode of the network comprises:
        obtaining configuration parameters of initializing the application mode of the network via a Media Independent Function, MIF, in an Access Gateway, AG or from Operation & Maintenance, O&M, module, and
        configuring the obtained configuration parameters of initializing the application mode of the network into the MIF of an access network; and
    the initializing the application mode of the communication terminal comprises:
        configuring, by a High Layer Function, HLF, of the communication terminal, the information about the application mode supported by the communication terminal into the MIF of the communication terminal.

* * * * *